Patented Nov. 12, 1935

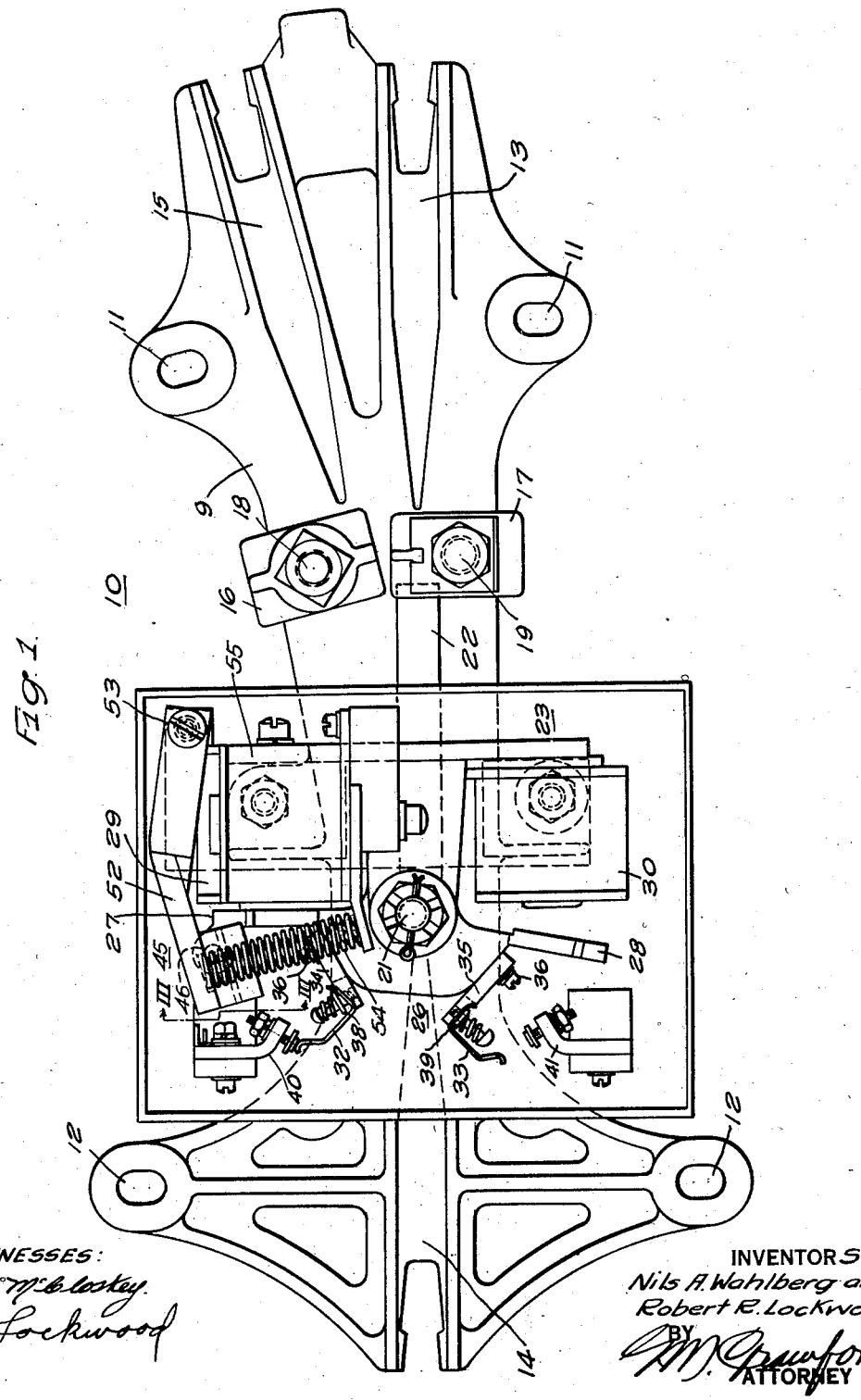

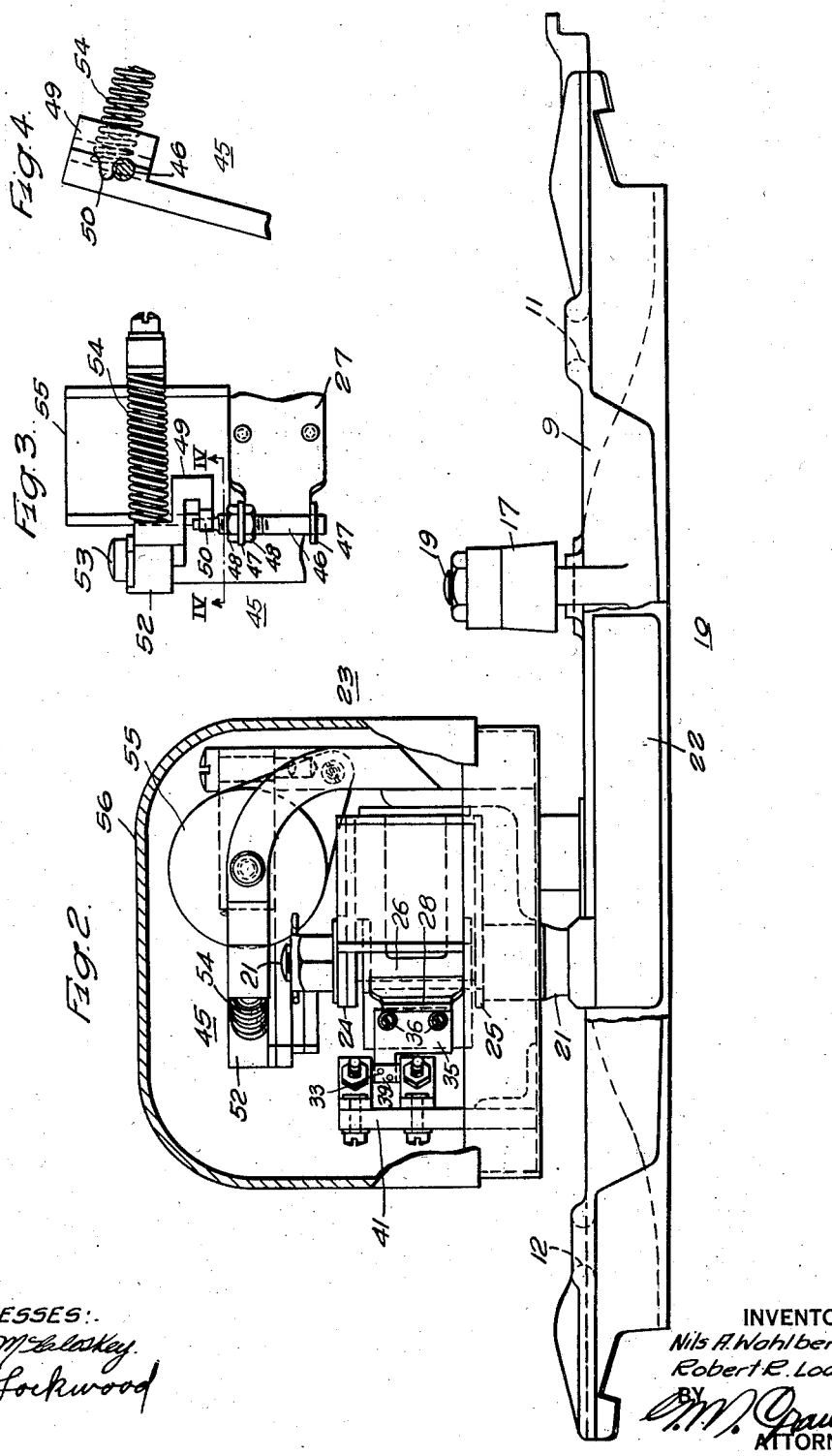

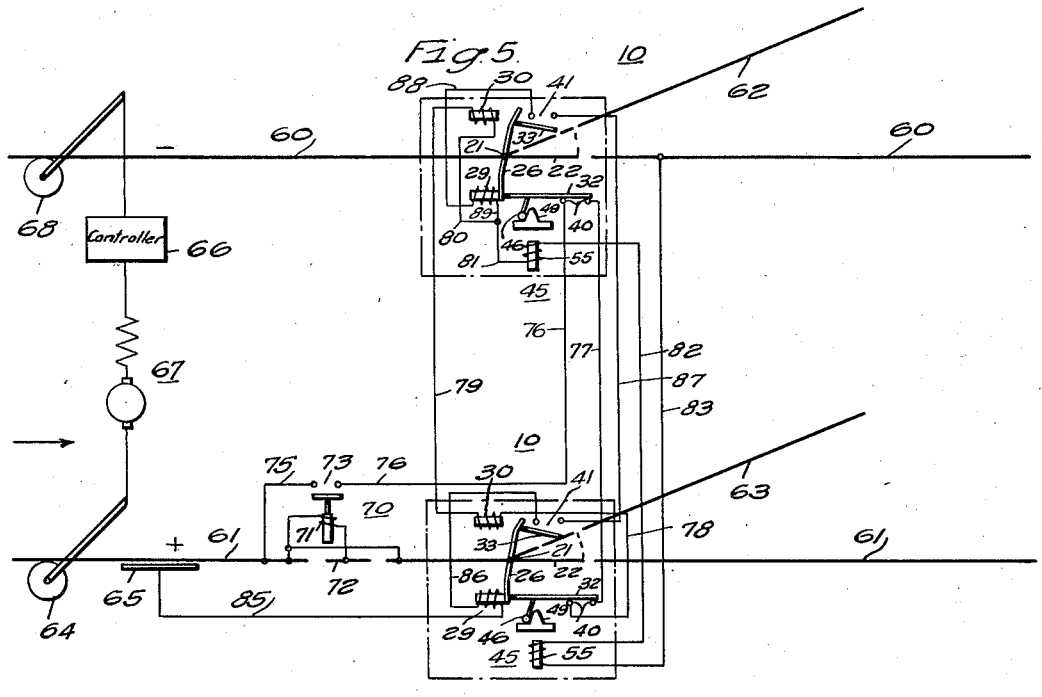

2,020,924

UNITED STATES PATENT OFFICE 2,020,924

TROLLEY FROG

Nils A. Wahlberg, Wilkinsburg, and Robert R. Lockwood, East Pittsburgh, Pa., assignors to Westinghouse Electric & Manufacturing Company, East Pittsburgh, Pa., a corporation of Pennsylvania Application October 14, 1933, Serial No. 693,558

9 Claims. (Cl. 191—38)

Our invention relates, generally, to trolley frogs and it has particular relation to electrically-operated trolley wire frogs for use in overhead trolley wire systems for electric vehicles.

The object of our invention, generally stated, is to provide a trolley wire frog which shall be simple, efficient and positive in operation and which may be readily and economically manufactured and installed.

The principal object of our invention is to provide for guiding a current collector carried by an electric vehicle along either a main or a branch conductor at the will of an operator on the vehicle.

Another important object of our invention is to provide for latching the tongue of a trolley wire frog in either position.

Still another object of our invention is to provide for releasing the latch only when it is desired to operate the tongue to another position.

Another object of our invention is to insure that both frogs in a double overhead system are operated simultaneously.

A still further object of our invention is to provide for operating a trolley wire frog to either position at the will of an operator in contra-distinction to the operation of the trolley frog to one position only at the will of an operator.

Still another object of our invention is to provide for indicating the position of the tongue in an electrically-operated frog so that an operator may be informed as to the condition of the frog.

Other objects of our invention will in part be obvious and in part appear hereinafter.

Our invention, accordingly, is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of our invention, reference may be had to the following description taken in connection with the accompanying drawings; in which Figure 1 is a view, in top plan, of an electrically-operated trolley wire frog constructed in accordance with our invention;

Fig. 2 is a view, in side elevation, of the frog illustrated in Fig. 1, certain parts being broken away to more clearly illustrate the invention;

Fig. 3 is a view taken along the line III—III of Fig. 1;

Fig. 4 is a sectional view taken along the line IV—IV of Fig. 3; and

Figs. 5 and 6 are diagrams illustrating how the frog may be connected into an overhead trolley wire system.

Referring now particularly to Figs. 1 and 2 of the drawings, the reference character 9 designates generally the pan of a trolley wire frog, shown generally at 10, having pairs of apertures 11 and 12 whereby it may be supported in the customary manner in an overhead trolley wire system. The pan 9 is provided with alined grooves 13 and 14 for a main conductor and an angularly disposed groove 15 for a branch conductor. Suitable approach members (not shown) may be provided at the ends of the grooves 13, 14 and 15, as is well known in the art, to provide for a smooth transition from and to the under surface of the pan 10.

In order to secure the conductors to the pan 9, clamp members 16 and 17 are provided which may be secured to the pan 9 by means of bolts 18 and 19. It will be understood that the branch conductor in the groove 15 terminates at or near the trolley pan 9 after it has passed through the clamp member 16. It will also be understood that the main conductor in the alined grooves 13 and 14 passes straight through and over the pan 9, there being no break in its continuity. The main conductor is positioned in a groove (not shown) around a king pin 21, which it is desirable to position directly in the path thereof for a purpose which will be set forth hereinafter.

It will be apparent that any suitable type of pan 9 may be used and that it may be of cast or other construction. Since the particular type of pan illustrated in the drawings forms no part of our invention, it will be understood that any other similar type of pan may be used, if desired, without departing from the scope of our invention.

In order to guide a current collector carried by an electric vehicle, from the main conductor to follow along the branch conductor or to provide for its continuing to follow along the main conductor, a tongue 22 is provided and is secured to the king pin 21. The tongue 22 is movable underneath the pan 9 so that it may be alined either with the main conductor, as in the position illustrated, or so that it may be alined with the branch conductor.

As illustrated, the king pin 21 extends through a suitable opening in the upper surface of the pan 9 and is journaled in a suitable frame, shown generally at 23, which is provided with laterally extending ears 24 and 25. It will be observed that the king pin 21 is mounted for rotation near the outer ends of the laterally positioned ears 24 and 25.

An armature, shown generally at 26 and provided with oppositely extending arms 27 and 28, is secured to the king pin 21. In order to operate the armature for rotating the king pin 21 and thereby the tongue 22, operating windings 29 and 30 are provided in operative relation and corresponding respectively to the oppositely extending arms 27 and 28 of the armature 26. It will be understood that, when the winding 29 is energized, the tongue 22 will be moved into alinement with the main conductor and that, when the other operating winding 30 is energized, the tongue 22 will be moved into alinement with the branch conductor.

It is desirable to complete certain circuits on the operation of the tongue 22 to either of the alined positions and, for this purpose, movable contact members 32 and 33 are provided and mounted on suitable insulating supports 34 and 35 which are secured to the armature 26 by screws 36. The contact members 32 and 33 are connected together by means of suitable connecting links 38 and 39. The movable contact members 32 and 33 are disposed to engage stationary contact members 40 and 41, respectively. The circuit connections of the contact members 32, 33, 40 and 41 will be more fully illustrated and described hereinafter.

In view of the fact that the overhead trolley wire system is subjected to considerable vibration, and, further, for the reason that it is desirable to maintain the tongue 22 in accurate alinement with either the main or the branch conductor, a latching mechanism, illustrated generally at 45, is provided and is more clearly illustrated in Figs. 3 and 4 of the drawings. At the extreme end of the arm 27 of the armature 26 a pin 46 is mounted in suitable upstanding lugs 47 that may be formed integrally with the arm 27. The pin 46 may be threaded and held securely in position by means of lock nuts 48.

As illustrated, the upper end of the pin 46 is disposed in engagement with a latch 49, having a single tooth 50 for directly engaging the pin 46. When the latch 49 is withdrawn and the tongue 22 is operated to alinement with the branch conductor, it will be understood that the upper end of the pin 46 will have been moved to the other side of the tooth 50. When the latch 49 is positioned as illustrated in the drawings, it will hold the pin 46 in such position as to maintain the tongue 22 in alinement with the main conductor.

The latch 49 may be mounted on or carried by an armature 52, which is pivoted at 53, and it may be biased into engagement with the pin 46 by means of a compression spring 54. In order to release the latch 49, a releasing winding 55 is provided in operative relation relative to the armature 52 so that on energization thereof, the latch 49 is withdrawn from engagement with the pin 46, at the same time overcoming the force exerted by the spring 54 tending to maintain the engagement. As soon as the winding 55 is deenergized, the spring 54 serves to bias the latch 49 into engagement with the pin 46 in whichever position the latter may be.

A suitable housing or cover 56 is provided over the more easily damaged part of the mechanism of the frog in order to protect it from the weather.

Referring now particularly to Fig. 5 of the drawings, it will be observed that the circuits are there shown for connecting the trolley wire frog described hereinbefore for operation in a trolley wire system. As illustrated, two of the trolley wire frogs 10 are provided in an overhead system comprising two conductors. The reference characters 60 and 61 designate the main conductors while reference characters 62 and 63 designate the branch conductors which intersect the main conductors 60 and 61, respectively, at an angle. It will be understood that the conductors 60 and 62 are maintained at a negative potential while conductors 61 and 63 are maintained at a positive potential, although these conductors are shown broken in the vicinity of the trolley wire frogs 10 in order to more clearly illustrate the invention. For the purpose of this description the trolley wire frog connected to the negative conductor 60 will be termed the negative frog while the corresponding duplicate frog connected to the positive conductor 61 will be termed the positive frog.

In order to operate the trolley wire frogs 10 to the "straight-through" position, that is, the position in which they are illustrated so that a current collector 64 will follow the main conductor, a shunt contactor 65 is provided in the path of the current collector 64 which is carried by an electric vehicle that is represented schematically by a controller 66 and a motor 67. A second current collector 68 is provided for maintaining contact engagement with the negative conductor 60.

With a view to operating the trolley wire frogs 10 to the "turn-out" position, that is, a position in which the tongues 22 are disposed in alinement with the branch conductors 62 and 63, a series relay, shown generally at 70, is provided having an operating winding 71 which is connected in series circuit relation with the positive conductor 61. As illustrated, the winding 71 is connected between the conductor 61 and an insulated section 72 of the positive conductor 61.

In operation, assuming that the operator desires to follow the branch conductors 62 and 63 and the vehicle is moving in the direction indicated by the arrow, it is essential that the tongues 22 be operated to a position in alinement with the branch conductors. Therefore, the operator approaches the junction in the overhead trolley wire system with the power on. The current collector 64 comes into engagement with the shunt contactor 65, thereby forcing it into engagement with the positive conductor 61. No action is caused at this time by the engagement of the shunt contactor 64 with the conductor 61 for a reason which will be set forth hereinafter.

As the current collector 64 continues to traverse the positive conductor 61, it finally comes into contact engagement with the insulated portion 72 of the positive conductor 61 at which time it will be understood that the current for operating the motor 67 is caused to flow through the winding 71 of the series relay 70. The contact members 73 of the series relay 70 are then closed, thereby completing a circuit for energizing windings 30 of the trolley wire frogs 10, which are connected in series circuit relation, and at the same time releasing the latches 49 from engagement with the pins 46 to permit the movement of the tongues 22 into alinement with the branch conductors 62 and 63.

The circuit for energizing the windings 30 and 55 may be traced from the energized conductor 61 through conductor 75, contact members 73 of the series relay 70, conductor 76, contact members 32 and 40 of the negative trolley wire frog, conductor 77, contact members 32 and 40 of the positive trolley wire frog, conductor 78, operating winding 30 of the positive trolley wire frog, conductor 79, operating winding 30 of the negative trolley wire frog, conductors 80 and 81, releasing winding 55 of the negative trolley wire frog, conductor 82, releasing winding 55 of the positive trolley wire frog and conductor 83 to the negative trolley wire conductor 70.

In tracing the foregoing circuit, it will be observed that the operating windings 30 of both the positive and negative frogs are connected in series circuit relation with each other, thereby insuring that they will be operating simultaneously to correspondingly operate the tongues 22 into alinement with the branch conductors 62 and 63. It will also be observed that the releasing windings 55 of both of the trolley wire frogs are connected in series circuit relation and in series circuit relation with the operating windings 30. Therefore, as soon as the operating windings 30 are energized, the releasing windings 55 are also energized to release the latches 49 and thereby permit the movement of the tongues 22 to the desired positions.

As soon as the tongues 22 have been moved to the desired positions, the contact members 32 and 40 of both of the trolley wire frogs are opened thereby effecting the de-energization of the operating windings 30 and the releasing windings 55 and permitting the latch 49 to engage the pin 46 in the new position.

Since the windings 30 and 55 will be deenergized as soon as the series relay 70 is de-energized, which will occur as soon as the collector 64 is moved out of engagement with the insulated section 72 or when sufficient current ceases to flow through the winding 71 as to maintain the contact members 73 closed, it will be understood that it is not essential to provide the sets of contact members 32 and 40. However, for the purpose of immediately de-energizing the windings 30 and 55 as soon as the tongues 22 have been moved to the desired positions in alinement with the branch conductors 62 and 63, it is desirable to provide them.

Assuming now that it is desired to operate the tongues 22 from alinement with the branch conductors 62 and 63 back into alinement with the main conductors 60 and 61, the circuits for such operation will now be traced. Under these conditions, contact members 41 of each of the trolley wire frogs will be bridged by the corresponding movable contact members 33. It will be understood that these contact members will be closed as the result of the previous operation of the tongues 12 to alinement with the branch conductors 62 and 63.

When the vehicle is travelling in the direction indicated by the arrow, the current collector 64 engages the shunt contactor 65, causing it to engage or be connected to the positive conductor 61. At this time operating windings 29 of the trolley wire frogs are energized, together with releasing windings 55 thereby causing and permitting the tongues 22 to be moved back into alinement with the main conductors 60 and 61.

The circuit for effecting this operation may be traced from positive conductor 61 through the shunt contactor 65, conductor 85, operating winding 29 of the positive trolley wire frog, conductor 86, contact members 33 and 41, conductor 87, contact members 33 and 41, conductor 88, operating winding 29 of the negative trolley wire frog, conductors 89 and 81, releasing winding 55, conductor 82, releasing winding 55 of the positive trolley wire frog and conductor 83 to the negative conductor 60.

It will be observed that the operating windings 29 are connected in series circuit relation with the releasing windings 55 in the same manner as are the operating windings 30. Thus, whenever either of the sets of series connected operating windings 29 or 30 is energized, the releasing windings 55 will simultaneously be energized, thereby releasing the latches 49 and permitting the tongues 22 to be operated to a position corresponding to whichever of the sets of operating windings 29 or 30 has been energized.

It will be noted that, as soon as the tongues 22 are moved into alinement with the main conductors 60 and 61, the contact members 33 and 41 of both the positive and negative frogs are opened thereby effecting the de-energization of the operating windings 29 and the releasing windings 55. This function is highly desirable in order to prevent the burning out of these windings should operating potential be applied thereto for any considerable length of time such as might be the case in the event that the vehicle should be stopped in such position as to cause the shunt contactor 64 to engage the positive conductor 61 for any such extended length of time. While two sets of contact members 33 and 41 are illustrated as being connected in series circuit relation, it will be understood that a single set may be used. However, in view of the fact that a relatively high potential, such as 500 volts, is maintained between the conductors 60 and 61, it is desirable to provide for opening the circuit at more than one point in order to reduce the deleterious effects of arcing to a minimum.

Referring now particularly to Fig. 6 of the drawings, it will be observed that the shunt contactor 65 illustrated in Fig. 5 of the drawings, has been omitted. The control of the movement of the tongues 22 to either position is accomplished by means of the series relay 70, which may be energized or not depending upon whether the operator approaches the junction with the power on or the power off.

In order to indicate that the tongues 22 are in the position illustrated in the diagram, signal lamps 92 are provided while to indicate that the tongues 22 are in a position in alinement with the branch conductors 62, 63, signal lamps 93 are provided.

For the purposes of clarity, the trolley wire frog 10 in the negative conductor 60 will again be referred to as the negative frog while the corresponding frog in the positive conductor 60 will again be designated as the positive frog.

Assuming that the operator, while traveling in the direction indicated by the arrow, desires to follow the branch circuit, he will approach the junction with the power on. The operator will be informed that the tongues 22 are positioned in the "straight-through" position because of the fact that the signal lamps 92, corresponding to this position will be illuminated.

The circuit for energizing the signal lamps 92 may be traced from the positive conductor 61 through conductor 95, signal lamps 92, conductor 96, contact members 32 and 40 and conductors 97 and 98 to the negative conductor 60.

As soon as the current collector 64 engages the insulated section 72 of the positive conductor 61, current is caused to flow through the series winding 71, as set forth hereinbefore, and contact members 73 are closed. The operating windings 30 and releasing windings 55 of the negative and positive trolley wire frogs are then energized, thereby causing and permitting the tongues 22 to be moved into alinement with the branch conductors 62 and 63.

The circuit for energizing the windings 30 and 55 may be traced from the energized conductor 61 through conductor 99, contact members 73, conductor 100, winding 30 of the negative frog, conductor 101, winding 30 of the positive frog, conductor 102, contact members 32 and 40 which are closed, conductors 103 and 104, releasing winding 55 of the positive frog, conductor 105, releasing winding 55 of the negative frog and conductors 106 and 98 to the negative conductor 60.

As soon as the tongues 22 of both of the frogs 9 have been moved to positions in alinement with the branch conductors 62 and 63, contact members 32 and 40 are opened thereby effecting the de-energization of operating windings 30 and at the same time contact members 33 and 41 are closed setting up circuits for the subsequent operation of the operating windings 29. In addition, contact members 32 and 40 are opened thereby removing energizing potential from the signal lamps 92 while the contact members 33 and 41 are closed to apply energizing potential to the signal lamps 93, thereby indicating that the tongues 22 are in alinement with the branch conductors 62 and 63.

In the event that a second vehicle approaches the junction and the operator also desires to follow the branch circuit, the operator merely approaches the insulated section 72 with the power off. Neither of the trolley wire frogs 10 then function and the tongues 22 will remain in alinement with the branch conductors 62 and 63, in which position the signal lamps 93 indicate them to be.

Assuming now that the operator of a vehicle traveling in the direction indicated by the arrow desires to follow the conductors 60 and 61 rather than the branch conductors 62 and 63, although the tongues 22 are in alinement with the latter conductors as indicated by the signal lamps 93, he approaches the junction with the power on. The series relay 70 is then energized as set forth hereinbefore and in this instance operating windings 29 are energized, together with releasing windings 55 to effect and permit a movement of the tongues 22 into alinement with the main conductors 60 and 61.

The circuit for energizing the operating windings 29 may be traced from the positive conductor 61 through conductor 99, contact members 73, conductor 100, operating winding 29 of the negative frog, conductor 108, operating winding 29 of the positive frog, conductor 109, contact members 33 and 41 which were previously closed, conductors 110 and 104, releasing winding 55 of the positive frog, conductor 105, releasing winding 55 of the negative frog, and conductors 106 and 98 to conductor 60.

It will then be observed that the tongues 22 will be actuated back to alinement with the main conductors 60 and 61 and that the signal lamps 93 will be extinguished. It will further be observed that the signal lamps 92 will again be illuminated, indicating that the tongues 22 are in alinement with the main conductors 60 and 61.

Since the operating windings 29 and 30 on both the positive and negative frogs 10 are connected in such manner as to be operated simultaneously, it will be readily understood that the functions of the contact members 32 and 40 and 33 and 41 will be equally well performed if these contact members are all positioned on one of the frogs. That is, the contact members for controlling the operation of the signal lamps 92 and 93 may be operated in accordance with the movement of the tongue 22 of the positive frog 10 while at the same time, the remaining contact members are also arranged to function in the manner set forth hereinbefore.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. An electrically-operated trolley-wire frog comprising, in combination, a trolley pan adapted to receive main and branch conductors, a king pin rotatably mounted on the pan, a tongue secured to the king pin and movable thereby to permit alignment with either of said conductors, an armature secured to said king pin, a pair of operating windings each individual to one of said aligned positions and disposed in operative relation to said armature for moving the tongue to either of the aligned positions depending on which winding is energized, a pin carried by said armature, a latch disposed to engage said pin in either position of said armature for securing said tongue in either of said positions, a spring for biasing said latch into engagement with said pin, an armature disposed to carry said latch, and a latch-releasing winding disposed in operative relation to said last named armature, said releasing winding being connected in series circuit relation with the operating windings for overcoming the biasing force of the spring and releasing the latch on energization of either of said operating windings.

2. An electrically-operated trolley frog for an overhead trolley wire system comprising, in combination, a trolley pan, a tongue mounted on the trolley pan for guiding a current collector carried by an electric vehicle to follow either a main or a branch conductor, a winding individual to each position of said tongue for moving the tongue to the corresponding position, control means disposed to be controlled by an operator on the vehicle for effecting the energization of at least one of said windings, contact means connected in series circuit relation with at least one of said windings and disposed to open the circuit thereto when the tongue has been moved to a predetermined position, latching means disposed to secure said tongue in either of said positions, and actuating means interconnected with said windings for releasing said latching means on energization of either of said windings.

3. An electrically-operated trolley frog for an overhead trolley wire system comprising, in combination, a trolley pan, a tongue mounted on the trolley pan for guiding a current collector carried by an electric vehicle to follow either a main or a branch conductor, a winding individual to each position of said tongue for moving the tongue to the corresponding position, control means disposed to be controlled by an operator on the vehicle for effecting the energization of at least one of said windings, contact means connected in series circuit relation with at least one of said windings and disposed to open the circuit thereto when the tongue has been moved to a predetermined position, a latch for securing said tongue in either of said positions, an armature for carrying said latch, and a latch-releasing winding disposed in operative relation to said armature, said releasing winding being connected in series circuit relation with both of said windings for releasing said latch on energization of either of said windings.

4. An overhead trolley wire system comprising, in combination, a pair of main conductors of opposite polarity for supplying power to an electric vehicle, a pair of branch conductors intersecting said main conductors, an electrically-operated frog located at each of the intersections of said conductors comprising a trolley pan adapted to receive a main and a branch conductor of the same polarity, a tongue pivotally mounted on the pan for guiding a current collector carried by the vehicle along either the main or the branch conductor, an operating winding individual to each position of said tongue for moving it to the corresponding position, a latch for securing said tongue in either of said positions, an armature for carrying said latch, and a releasing winding disposed in operative relation to said armature, circuit means for connecting the corresponding operating windings of each of the frogs in series circuit relation and in series circuit relation with said releasing windings, and means for energizing at least one set of series connected operated windings at the will of an operator on the vehicle for moving the tongues of the frogs in a predetermined direction.

5. An electrically-operated trolley wire frog comprising, in combination, a trolley pan adapted to receive main and branch conductors, a tongue mounted on the pan and disposed to be aligned with either of said conductors, a winding individual to each position of said tongue for moving it to the corresponding position, contact means connected in series circuit relation with each winding and adapted to be closed when the other winding is energized, a latch for securing said tongue in either of said positions, an armature for carrying said latch, a releasing winding disposed in operative relation to said armature, circuit means for connecting said first-mentioned windings in series circuit relation with said releasing winding, and means controlled by an operator on a vehicle having current collecting means in engagement with one of said conductors for effecting the energization of either of said first-mentioned windings depending on which was last energized to effect the movement of said tongue to a corresponding position.

6. An electrically-operated trolley wire frog comprising, in combination, a trolley pan adapted to receive main and branch conductors, a tongue mounted on the pan and disposed to be aligned with either of said conductors, a winding individual to each position of said tongue for moving it to the corresponding position, contact means connected in series circuit relation with each winding and adapted to be closed when the other winding is energized, a latch for securing said tongue in either of said positions, an armature for carrying said latch, a releasing winding disposed in operative relation to said armature, circuit means for connecting said first-mentioned windings in series circuit relation with said releasing winding, means controlled by an operator on a vehicle having current collecting means in engagement with one of said conductors for effecting the energization of either of said first-mentioned windings depending on which was last energized to effect the movement of said tongue to a corresponding position, and signal means operable in accordance with the movement of said tongue for indicating the position thereof to the operator.

7. An electrically-operated trolley-wire frog comprising, in combination, a trolley pan adapted to receive main and branch conductors, a tongue mounted on the pan and disposed to be aligned with either of said conductors, an armature connected to said tongue, a pair of operating windings each corresponding to one of said aligned positions and disposed in operative relation to said armature for moving the tongue to either of the aligned positions depending on which winding is energized, a latch for securing said tongue in either of said positions, an armature disposed to carry said latch, and a latch releasing winding disposed in operative relation to said last-named armature, said releasing winding being connected in series circuit relation with said operating windings for releasing said latch on energization of either of them.

8. An electrically-operated trolley-wire frog comprising, in combination, a trolley pan adapted to receive main and branch conductors, a king pin rotatably mounted on the pan, a tongue secured to the king pin and movable thereby to permit alignment with either of said conductors, an armature secured to said king pin, a pair of operating windings each individual to one of said aligned positions and disposed in operative relation to said armature for moving the tongue in either of the aligned positions depending on which winding is energized, a latch for securing said tongue in either of said positions, an armature disposed to carry said latch, and a latch releasing winding disposed in operative relation to said last-named armature, said releasing winding being connected in series circuit relation with said operating windings for releasing said latch on energization of either of them.

9. An electrically-operated trolley-wire frog for an overhead trolley wire system comprising, in combination, a trolley pan, a tongue mounted on the trolley pan for guiding a current collector carried by an electric vehicle to follow either a main or a branch conductor, electrical operating means connected to actuate said tongue into alignment with either of said conductors, control means disposed to be controlled by an operator on the vehicle for effecting the energization of said operating means to actuate said tongue to one of said aligned positions, contact means connected in series circuit relation with said electrical operating means and disposed to open the circuit thereto when the tongue has been moved to one of said positions, a latch for securing said tongue in either of said positions, an armature for carrying said latch, and a latch releasing winding disposed in operative relation to said armature, said releasing winding being connected in series circuit relation with said electrical operating means for releasing said latch on energization of said operating means.

NILS A. WAHLBERG.
ROBERT R. LOCKWOOD.